United States Patent
Rudrappa et al.

(10) Patent No.: US 10,755,314 B2
(45) Date of Patent: Aug. 25, 2020

(54) METHOD AND SYSTEM FOR INTERACTION BETWEEN USERS, VENDORS, BRANDS, STAKEHOLDERS FOR PRODUCTS AND SERVICES IN REAL TIME DURING USAGE OR CONSUMPTION LIFE CYCLE

(71) Applicant: Pradeep Bhargava, Bangalore (IN)

(72) Inventors: Kiran Rudrappa, Bangalore (IN); Naveen Shankar, Bangalore (IN)

(73) Assignee: Pradeep Bhargava, Bangalore (IN)

( * ) Notice: Subject to any disclaimer, the term of this patent is extended or adjusted under 35 U.S.C. 154(b) by 928 days.

(21) Appl. No.: 14/566,747

(22) Filed: Dec. 11, 2014

(65) Prior Publication Data

US 2015/0178787 A1 Jun. 25, 2015

(51) Int. Cl.
*G06Q 20/22* (2012.01)
*G06Q 30/02* (2012.01)
*H04L 29/06* (2006.01)

(52) U.S. Cl.
CPC .......... *G06Q 30/0269* (2013.01); *H04L 63/08* (2013.01)

(58) Field of Classification Search
None
See application file for complete search history.

(56) References Cited

U.S. PATENT DOCUMENTS

2012/0190386 A1* 7/2012 Anderson .............. G01C 15/04
455/456.3
2012/0191566 A1* 7/2012 Sayan ................ G06Q 30/0601
705/26.8

OTHER PUBLICATIONS

Christine Michelle Improving the Competitiveness of North Carolina Textile Manufacturers With E-Business Initiatives, pp. 22-25 (Year: 2006).*

* cited by examiner

*Primary Examiner* — Anita Coupe
*Assistant Examiner* — Darnell A Pouncil
(74) *Attorney, Agent, or Firm* — Barry Choobin; Patent 360 LLC

(57) ABSTRACT

The various embodiments herein disclose an intelligent system and method for user behavior, communication, connection and engagement management. The intelligent system is a digital platform for connecting and engaging users, their product or service brands or vendors and related stakeholders that enable all the participants to connect, communicate and engage with each other. Further, the platform provides a means to establish two way relationships between the users and brands or vendors.

12 Claims, 6 Drawing Sheets

METHOD AND SYSTEM FOR INTERACTION BETWEEN USERS, VENDORS, BRANDS, STAKEHOLDERS FOR PRODUCTS AND SERVICES IN REAL TIME DURING USAGE OR CONSUMPTION LIFE CYCLE

CROSS REFERENCE TO RELATED APPLICATION

The application claims the priority of Indian Provisional Patent Application with no. 5158/CH-E/2013 filed on Nov. 14, 2013 and post dated to Dec. 14, 2013 with the title, "System and Method for Connecting, Communicating, and Engaging Users, Brands and Related Ecosystem", and the contents of which is incorporated in entirety by reference herein.

BACKGROUND

Technical Field

The embodiments herein generally relates to digital access and particularly relates to pre, during or post purchases or consumption of products or services and associated ecosystem and more particularly relates to a system and method for connecting, communicating and engaging users, brands, the suppliers and related ecosystem.

Description of the Related Art

Global competition has increased the need for brands and vendors to identify, capture and retain the users who buy various products or solutions or services from them. However the brands and vendors find it difficult to directly connect with the users due to various constraints. Even though the dedicated web sites, email, registration, etc., have been deployed by the brands and vendors, an adoption and efficiency in connecting the end users is poor and is not effective. Besides, the end user finds it much more inconvenient to use them because every brand and vendor deploy their own systems.

Increased affordability, crave for better life style, and continued-launch of new products and services by brands and vendors has lead the users to deal with increased number of products or services. Any non-availability or under-utilization or malfunctioning of these products or services affects the user's day to day life significantly. This trend is likely to grow significantly in the coming years. In this context, the users want to get connected with brands and vendors for various associated after sales services provided to cover the entire product or service life cycle, for buying the additional product/solution/service, accessories, spares, installation, product usage experience, warranty tracking, insurance tracking, product documents tracking, service-support during usage, assigning, tracking and managing product and product service history for impact and severity review, management and corrective action at every touch-point, recycle or end of life management of the product/solution etc., during the product or service life cycle.

With increased products or services in the market, the emergence of various technologies, increased competition among brands, vendors and their market strategies to attract buyers has lead the users to find difficulty in making a purchase decision. Today the users have more choices for the products or services, but have very much limited access to correct and appropriate information for making decisions about with whom or why or how they want to do business or evaluate the right products or services or vendors or brands with respect to the need.

It also becomes difficult for the users to manage and administer his/her products and services availed through various brands and vendors. Further the brands, service providers and vendors have to go through various channels to connect with the user.

Hence, there is a need to develop a platform which enables all the participants to connect, communicate and engage with each other based on the products or services acquired by the user. There is a further need to provide a system and method to connect, communicate and engage the users, brands, vendors, the suppliers and all other stakeholders to improve the services and availability the brands or vendors, user's experience and convenience.

The above mentioned shortcomings, disadvantages and problems are addressed herein and which will be understood by reading and studying the following specification.

OBJECTIVES OF THE EMBODIMENTS

The primary object of the embodiments herein is to provide a system and method for connecting, communicating, engaging the users, brands, vendors, the suppliers and related ecosystem.

Another object of the embodiments herein is to provide a common platform for registering a product or service along with one or more credentials associated with the product or service received from a plurality of vendors, brands and stakeholders.

Yet another object of the embodiments herein is to provide a common platform to enable all the participants to connect and engage with each other based on the products and services acquired by the user.

Yet another object of the embodiments herein is to generate a unique user-id for each user to initiate activity and to provide effective user services to build profitable and valuable relationships among all the users, brands, vendors, the suppliers and stakeholders in the ecosystem Yet another object of the embodiments herein is to provide analytics on the data or information acquired from various channels and to generate analysis and market intelligent reports.

Yet another object of the embodiments herein is to provide a platform interfaces for an application development by public or companies or individuals for connecting, communicating and engaging the users, brands, vendors, the suppliers and related ecosystem Yet another object of the embodiment herein is to provide a common platform to provide a community for the plurality of the vendors, the plurality of the stakeholders, and the plurality of the users for interacting and communicating with each other.

Yet another object of the embodiments herein is to provide various tools to all the participants for various networking and engagement activities.

These and other objects and advantages of the embodiments herein will become readily apparent from the following detailed description taken in conjunction with the accompanying drawings.

SUMMARY

The embodiments herein generally relate to an overall eco system comprising a plurality of hardware devices having one or more sensors for measuring and controlling the hardware devices. The hardware devices include but are not limited to electronic appliances, gadgets, automobiles, medical devices, mobile computing devices, tablets and online market place and associated infrastructure. The embodiments herein particularly relates to a system and method for connecting, communicating and engaging users, brands in the said overall ecosystem.

The embodiments herein disclose an intelligent system and method for user behavior and engagement management. The intelligent system is a digital platform for connecting, communicating and engaging the users, the products or service brands and related stakeholders that enables all the participants to connect, communicate and engage with each other based on the products and services acquired by the user. Further, the platform provides a means to establish a plurality of relationships between the user, vendors, brands, brand's channels and brand's suppliers by providing intuitive cloud based visualization modeling and rendering interface with drill-down of product or service based on the unique product ID to identify and ensure a right or appropriate selection of parts, spares or accessories associated with the product based on the unique product ID.

The embodiments herein refer a user or an end user or a consumer as a person or group of people, such as a household or company who are the final users of products or services.

The embodiments herein refer Brand as a name, term, design, symbol, or any other feature that identifies a product or service of one seller to distinguish the same from that of other sellers or service providers.

The embodiments herein refer a vendor, or a supplier, in a supply chain as an enterprise that contributes the products or services in a supply chain.

The usage of the term "brand or vendor" in the embodiments herein always implies referring to both unless otherwise specifically mentioned.

According to one embodiment herein, the brand comprises companies and vendors providing the products and services to a plurality of users through the platform.

According one embodiment herein, a computer implemented method is provided for an between a plurality of users, vendors, brands, stakeholders with respect to a plurality of products and services in real time during usage and consumption of products or services in an entire life cycle using a computing device. The method comprises the following steps. A cloud based platform is accessed by a plurality of vendors, a plurality of stakeholders, and a plurality of end users. The plurality of vendors, the plurality of stakeholders and the plurality of end users are registered with the platform. During the registration process, the login details and authentication details of the plurality of vendors, the plurality of stakeholders and the plurality of end users are provided. A plurality of data is collected from the plurality of vendors, the plurality of stakeholders, and the plurality of users. The plurality of data includes product information, service information, mobile number, a product identifier, warranty details and demographic details. The plurality of data collected from the plurality of vendors, the plurality of stakeholders is stored in a cloud data base. One or more products or services are associated with one or more activity circles based on preferences. The activity circle includes the plurality of vendors, the plurality of stakeholders, and the plurality of users.

According one embodiment herein, the method further comprises providing analytics in a plurality of ways to the plurality of vendors, the plurality of stakeholders and the users.

According one embodiment herein, the method further comprises monitoring a relationship between the plurality of vendors, the plurality of stakeholders and the plurality of users.

According one embodiment herein, the method further comprises integrating a customer-relationship management, a social media and an enterprise resource solution.

According one embodiment herein, the method further comprises recommending one or more products and services to the plurality of vendors, the plurality of stakeholders, and the plurality of users based on a plurality of attributes of the vendors, stakeholders and users. The plurality of attributes include a product information, service details, demographic details, financial details, and preferences, and wherein the plurality of attributes are collected and stored with respect to a respective vendor, stakeholder and user in the cloud database.

According one embodiment herein, the authentication includes multi-factor authentication comprising a unique user id, a password, a bio metric data, voice, and retina of eye.

According one embodiment herein, the authorization details includes business policies and rules for a plurality of services and stakeholders.

According one embodiment herein, the plurality of vendors and the plurality of stakeholders operate in a standalone mode or shared mode.

According one embodiment herein, the preferences include price range of a product or service, location, ranking of a product or service, quality of a product or a service and a brand name, and the preferences are input by a user.

According one embodiment herein, the plurality of vendors, the plurality of stakeholders, and the plurality of users registered to the platform searches, retrieves and contacts each other based on the preferences or registered credentials.

According one embodiment herein, a system is provided for interaction between users, vendors, brands, brand's suppliers, brand's channels and the stakeholders with respect to products and services in real time during usage and consumption life cycle of a product or service. The system comprises a registration module for registering a plurality of vendors, a plurality of stakeholders and a plurality of end users. The registration module is configured to receive an authentication details and authorization details from the plurality of vendors, the plurality of stakeholders and the plurality of end users to complete a registration. A cloud database is provided for storing a plurality of data related to plurality of products, a plurality of services, a plurality of vendors, a plurality of stakeholders, and a plurality of users. A rule engine is configured to generate a set of rules to generate a plurality of recommendations with respect to the plurality of the vendors, the plurality of stakeholders and the plurality of users. A search engine is communicatively coupled with the cloud database and configured to search and retrieve relationships between the plurality of the vendors, the plurality of stakeholders and the plurality of users based on the generated set of rules. A recommendation engine is configured to recommend one or more products and services with respect the plurality of the vendors, the plurality of stakeholders and the plurality of users based on the searched and retrieved relationships between the plurality of the vendors, the plurality of stakeholders and the plurality of users. An integration engine is configured to integrate a social media, enterprise resources, and customer relationship management. A maintenance module is configured to maintain the platform in the cloud to enable the plurality of the vendors, the plurality of stakeholders and the plurality of users to interact with each other through the platform in real time to acquire a desired data or service.

According one embodiment herein, the system further comprises an analytics module for providing analytics in a plurality of ways based on one or more attributes. The attributes are set by the rule engine, and the plurality of attributes includes a product or service information, demographic details, financial details, and preferences.

According one embodiment herein, the system further comprises a demand projecting module for projecting a demand for the plurality of products and services based on the results provided by the analytics module.

According one embodiment herein, the authentication includes multi-factor authentication comprising a unique user id, a password, a bio metric data, voice, and retina of eye.

According one embodiment herein, the authorization details includes business policies and rules for a plurality of services and stakeholders.

According one embodiment herein, the plurality of vendors and the plurality of stakeholders operate in a standalone mode or shared mode.

According one embodiment herein, the preferences include price range of a product or service, location, ranking of a product or service, and a brand name, and the preferences are input by a user.

According to an embodiment herein, the users, the vendors and the brands register on the platform by providing the necessary credentials. The system generates unique user-ids for the user, vendors and the brands after authenticating the user credentials. The platform stores the user credentials along with the unique user-ids. The user access the system with the unique user-id. The user is allowed to add/change/modify/edit/delete the user credentials at any point in time and the same is updated in the platform.

According to an embodiment herein, the system provides an information exchange platform and framework across the whole products or solutions or services provided by the registered brands or vendors for fast and improved engagement with various stakeholders of the users, vendors and brands, involved in the whole life cycle of the product or solution or service. The user is linked or associated to product or service, which in turn is tagged to a unique identifier. The identifier includes but not limited to a unique code, one or more alphabets, one or more numerals, mobile number, IMEI number, or a combination of thereof.

According to an embodiment herein, the services includes such as but not limited to banking and financial institutions (BFI), educational services, business-to-business, business-to-consumer, health services and e-governance.

According to an embodiment herein, the system provides a platform for collecting valuable feedback and complaints from the users at various stages of whole product or a part of product, solution or service experience. The system provides a better reach to the user and ensures that the feedbacks are tracked closely to deliver the right or appropriate products and services and address any product or service related issues.

According to an embodiment herein, the system provides a method for tracking sales, purchases, warranty, insurance and other services used by the users by connecting an item purchased by the user with the brands and confirming a sales transaction. The system improves a consumer satisfaction by preventing an abuse of warranty.

According to an embodiment herein system also provides measurement of net promoter score of product or service by the user According to an embodiment herein, the user enables automated notifications related to various products and services availed. The system is configured for the whole automated notification or responses to include but not limited to warranties, insurance, services, replacements, exchange offers, second buys and manage the feedback for the respective notifications to ensure better engagement and relationship on a long term. The system provides a single click button to notify the brands on the services to be provided on demand to the user instantly.

According to an embodiment herein, an activity is initiated on the platform, when the registered user avails a product or service from a particular registered brand (first brand) once. The associated and registered stakeholder engages with the associated activity based on the privacy and usage policy of the user and the first brand. For example, when a user A buys a car from a brand M, the user is able to include the car details on the platform which is tagged with his user-id. The platform enables the activity X1, wherein a direct connection is established between the brand M and the user A. The related stakeholders associated with the brand M such as car insurance service provider K (who is also a registered user on the platform), accessory partner P (who are also registered user and partners with first brand M), and various departments of the first brand M will be able to connect with the user A on the platform. The user A and brands M, P, K can engage in various activities related to the car C with the user A. The activities comprises of notifications, promotions, consumer support services or various other services that can be availed by the user A. If user's A privacy and usage policy allows other registered stakeholders (who are not partners with the first brand M) to contact the user A, the stakeholders will be able to directly engage and communicate with the user A for the car C related products and services through the platform. In the similar manner, the same user A can have various activity circles related to the various products and services availed by the user A.

Similarly, when a user A2 buys a car C2 from a brand M2. The user A2 includes the car C2 details on the platform or details pushed to user A2 and the details are tagged with his user-id. The platform enables the activity X2, wherein a direct connection is established between the brand M2 and the user A2. All the related stakeholders associated with the brand M2 such as car C2 insurance service provider K2 (who is also a registered user on the platform), accessory partner P2 (who are also registered user and partners with first brand M2), and various departments of the second brand M2 will be able to connect with the user A2 on the platform. The user A2 and the brands M2, P2, K2 will be able to engage in various activities related to the car C2. The activities comprises of notifications, promotions, consumer support services or various other services that can be availed by the user A2. For example, if the user A2 avails or buys a music system C3 from the accessory partner P2 of the brand M2, then the accessory partner P2 himself become a brand M3 for the user A2 and starts a new activity circle.

According to an embodiment herein, the platform enables the users and the brands to choose between multiple securities or verification or authentication features such as but not limited to captcha and one time password (OTP). The user is identified by various parameters to bring unique user identity with the logics built around to manage and eliminate duplication of the user in the system. The user profile management carries the de-duplication parameters to prevent and ensure unique IDs are defined for each user.

According to an embodiment herein, the platform defines a value index for each set of data based on the need, want and wish list scale to ensure the right proposition is made for business value creation.

According to an embodiment herein, the system and method comprises an application for connecting, communicating and engaging with users, vendors, brands and associated ecosystem.

According to an embodiment herein, the platform enables the user to directly communicate with brands and their associated stakeholders with the help of single click button provided on the platform. The user can talk, chat, email to the brand or even associated department at the platform without going through various channels or iterations to connect with the exact department/section/experts related to the product/service of the brand. The user is able add/update/delete brand product and services based on his preference and also locate the availability of product or services based on location the user is positioned or filter based on location that user prefers to review based on his preference or need.

According to an embodiment herein, the system provides an interlink roadmap for a single click button. The platform enables the user to navigate through the activity channel related to the product or the service availed (or to be availed) to establish the single click facility to the desired department/section/experts related to the product/service of the brand and directly communicate with them.

According to an embodiment herein, the platform further comprises live streaming of information across various stakeholders for aspects of knowledge sharing by user's community or experts, product launch information (to include usage guide, troubleshooting methods, community information/experience information) and service details in various forms of notification, information exchange and interfaces such as but not limited to Live Radio, RSS Feeds, Training Materials, Whitepapers, Issue Guides, Recall management, Quality trackers/issues and Field calls.

According to an embodiment herein, the system prioritizes stakeholder's actions for the products or solutions or services using an engagement matrix.

According to an embodiment herein, the system fills in the functional gaps of the Brands, vendors or channels in their purchase, making, marketing, sales and service strategies by effectively leveraging the platform.

According to an embodiment herein, the system creates access pipe to all the users at anytime, anywhere while ensuring security of the data.

According to an embodiment herein, the system further provides an ability to decode error code on devices by comparing with standard patterns and providing more meaningful information According to an embodiment herein, the brands uses communication interface to communicate with the system or products or services to provide information associated with them, such as but not limited to diagnostic information, setup status, or the parameters that are measured. The information aid in making decisions by measuring, controlling and monitoring the associated devices. The system further provides information on the health status of the associated devices by capturing predictive maintenance information, service or replacement need.

According to an embodiment herein, the system further provides interfaces for developing user applications on platform to co-create values for each other, thus providing a building block for value added features.

According to an embodiment herein, the system and method comprises sentimental analysis. The sentimental analysis provides reviews on various products, services and brands or vendors to enable users to evaluate products or services so that users are in a position to decide with whom and how they want to do business. Furthermore, since users can get detailed insight into the competitor's product/service information, they could read the community reviews of that particular product or service and make intelligent decisions.

According to an embodiment herein, the system provides an intelligent pipe that carries all the useful information pertaining to the user. The system also embeds protective filters to prevent any information leakage across the whole system and also warranties that the right information is sent to the right user with various levels of security, privacy, data protection, authentication and availability.

According to an embodiment herein, the system further provides interfaces for a multi-tenant XaaS Services; where 'X' stands for 'Anything' and is not just limited to software as a service, hardware as a service, connectivity as a service, collaboration as a service, security as a service, privacy as a service, availability as a service, data protection as a service, connect as a service, engagement as a service, etc. As the platform provides "multi-tenancy" capability; multiple tenants shares the XaaS platform. XaaS hardware and software infrastructure is deployed on the platform, without recognizing the existence of other tenants to provide a level of "privacy and isolation". The system maximizes resource-sharing capability of the XaaS system. The system receives service requests from multiple users belonging to different tenants of the multi-tenant XaaS system.

According to an embodiment herein, the system is set or configured to ensure that resources in the XaaS system are categorized into different buckets or resource groups. Each bucket handles a category of the service requests. Based on the transactions associated with each bucket the cost is estimated for the service offerings of interest. The system dispatches service requests to resource groups according to the estimated costs, whereby the resources are shared, among the users, without impacting each other. This approach makes the platform dynamic even when there are no commonalities in the data the applications use.

According to an embodiment herein, Service Level Agreements (SLAs) are reviewed and agreed upon during the enrolment process of the tenants. SLAs specify desired performance levels to be delivered as well as the cost increments to be added for additional value added services when these requirements and resources scale-up the set limits. The system also plans and allocates a resource capacity for each tenant to ensure that SLA requirements are fulfilled. This allocation leads the platform to conservatively provision the resources in order to adequately cover tenant's peak and off-peak load requirements; thus managing the demand based allocations and support effectively.

According to an embodiment herein, the system further integrates with any existing retail system or CRM or any other IT systems. The system bring in interface or communication block set in any form such as but not limited to NFC, GPS, or any wired or wireless interfaces, to install and connect the necessary drivers, so as to connect to any of above systems for integration The system provides a single sign-in for membership, brand or vendor loyalty, push notifications and redeem points at any outlets or for any products/services immaterial of where the points where offered.

According to an embodiment herein, the system eliminates various barriers in accessing the product or service related information. The system provides access to all information on the platform at any time and from anywhere. The system also provides ease of use and comfort for users. The system eliminates use of paper documents related to product or service namely but not limited to warranty, insurance, user guide, manual, instruction manuals, software drivers etc., and digitizes the process and so always providing latest versions.

According to an embodiment herein, the system enables the user to extend warranty, insurance or purchase accessories without going through the hassle of intermediaries or agencies by directly getting connected to brands or vendors.

According to an embodiment herein, the system enables the users to share product or service experience with other like-minded or similar product or service owners or to all the community of users.

According to an embodiment herein, the platform enables the users to filter activity circle preview based on certain criteria such as but not limited to demography, location and types of products or services.

According to an embodiment herein, the system enables the consumers to "On-the-go" product or service purchase and seamless transfer of product or service ownership documents and all related information and storage at commonplace and creating circles as detailed above.

According to an embodiment herein, the platform enables the user (first user) to sell or transfer one or more products or services to another user (second user). Once, the product or service is sold or transferred to the second user, the activity circle is deleted from the first user and a request to accept the activity circle is sent to the second user.

According to an embodiment herein, the system enables the users to create "wish list". The user created "wish list" is showcased to one or more relevant registered brands or vendors based on user privacy settings. Further, one or more brands, users, community/group, experts or vendors are allowed to interact with the user to recommend or offer products or services while ensuring private settings of user or their interests.

According to an embodiment herein, the system enables the user to book, review, learn, share or provide feedback in advance on new product or service launches, or repairs or installation of products or services or test drive of vehicles or demos of products/services on the platform.

According to an embodiment herein, the platform enables brands or vendors to generate various product, services or user specific reports and analysis.

According to an embodiment herein, a reminder is sent to the plurality of the users, the plurality of the stakeholders, and to the plurality of the vendors, when the SLA is about to expire. Further, a provisional escalation is executed using one or more ways, when the SLAs are not met. The reminders are sent before the expiry of the SLAs while the provisional escalation is sent after the expiry of the SLAs.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
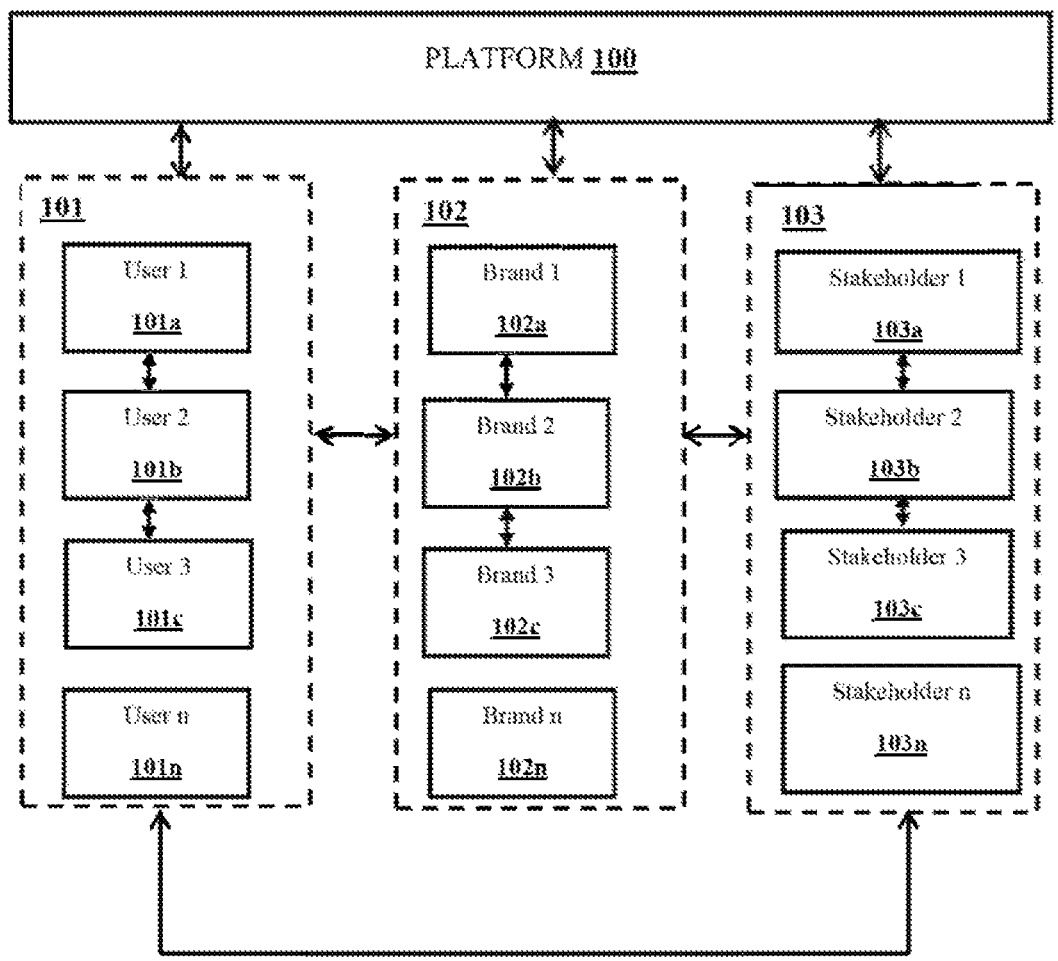
FIG. 1 illustrates a block diagram of a system for connecting, communicating and engaging user, brands or vendor and related ecosystem, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein generally relate to an overall eco system comprising a plurality of hardware devices having one or more sensors for measuring and controlling the hardware devices. The hardware devices include but are not limited to electronic appliances, gadgets, automobiles, medical devices, mobile computing devices, tablets and online market place and associated infrastructure. The embodiments herein particularly relates to a system and method for connecting, communicating and engaging users, brands in the said overall ecosystem.

The embodiments herein disclose an intelligent system and method for user behavior and engagement management. The intelligent system is a digital platform for connecting, communicating and engaging the users, the products or service brands and related stakeholders that enables all the participants to connect, communicate and engage with each other based on the products and services acquired by the user. Further, the platform provides a means to establish two way relationships between the user, vendors and the brands by providing intuitive cloud based visualization modeling and rendering interface with drill-down of product/service based on the unique product ID/service ID to identify and ensure a right or appropriate selection of parts, spares or accessories associated with the product/service based on the unique product/service ID.

The embodiments herein refer a user or an end user or a consumer as a person or group of people, such as a household or company who are the final users of products or services.

The embodiments herein refer Brand as a name, term, design, symbol, or any other feature that identifies a product or service of one seller to distinguish the same from that of other sellers or service providers.

The embodiments herein refer a vendor, or a supplier, in a supply chain as an enterprise that contributes the products or services in a supply chain.

The usage of the term "brand or vendor" in the embodiments herein always implies referring to both unless otherwise specifically mentioned.

According to one embodiment herein, the brand comprises companies and vendors providing the products and services to a plurality of users through the platform.

According one embodiment herein, a computer implemented method is provided for an between a plurality of users, vendors, brands, stakeholders with respect to a plurality of products and services in real time during a product life cycle using a computing device. The method comprises the following steps. A cloud based platform is accessed by a plurality of vendors, a plurality of stakeholders, and a plurality of end users. The plurality of vendors, the plurality of stakeholders and the plurality of end users are registered with the platform. During the registration process, the login details and authentication details of the plurality of vendors, the plurality of stakeholders and the plurality of end users are provided. A plurality of data is collected from the plurality of vendors, the plurality of stakeholders, and the plurality of users. The plurality of data includes product/service information, mobile number, a product/service identifier, warranty details and demographic details. The plurality of data collected from the plurality of vendors, the plurality of stakeholders is stored in a cloud data base. One or more products or services are associated with one or more activity circles based on preferences. The activity circle includes the plurality of vendors, the plurality of stakeholders, and the plurality of users.

According one embodiment herein, the method further comprises providing analytics in a plurality of ways to the plurality of vendors, the plurality of stakeholders and the users.

According one embodiment herein, the method further comprises monitoring a relationship between the plurality of vendors, the plurality of stakeholders and the plurality of users.

According one embodiment herein, the method further comprises integrating a customer-relationship management, a social media and an enterprise resource solution.

According one embodiment herein, the method further comprises recommending one or more products and services to the plurality of vendors, the plurality of stakeholders, and the plurality of users based on a plurality of attributes of the vendors, stakeholders and users. The plurality of attributes include a product/service information, demographic details, financial details, and preferences, and wherein the plurality of attributes are collected and stored with respect to a respective vendor, stakeholder and user in the cloud database.

According one embodiment herein, the authentication includes a unique user id and a password.

According one embodiment herein, the plurality of vendors and the plurality of stakeholders operate in a standalone mode or shared mode.

According one embodiment herein, the preferences include price range of a product or service, location, ranking of a product or service, and a brand name, and the preferences are input by a user.

According one embodiment herein, the plurality of vendors, the plurality of stakeholders, and the plurality of users registered to portal searches, retrieves and contacts each other based on the preferences or registered credentials.

According one embodiment herein, a system is provided for interaction between users, vendors, brands, stakeholders with respect to products and services in real time during a product/service life cycle. The system comprises a registration module for registering a plurality of vendors, a plurality of stakeholders and a plurality of end users. The registration module is configured to receive a login details and authentication details from the plurality of vendors, the plurality of stakeholders and the plurality of end users to complete a registration. A cloud database is provided for storing a plurality of data related to plurality of products or services, a plurality of vendors, a plurality of stakeholders, and a plurality of users. A rule engine is configured to generate a set of rules to generate a plurality of recommendations with respect to the plurality of the vendors, the plurality of stakeholders and the plurality of users. A search engine is communicatively coupled with the cloud database and configured to search and retrieve relationships between the plurality of the vendors, the plurality of stakeholders and the plurality of users based on the generated set of rules. A recommendation engine is configured to recommend one or more products and services with respect the plurality of the vendors, the plurality of stakeholders and the plurality of users based on the searched and retrieved relationships between the plurality of the vendors, the plurality of stakeholders and the plurality of users. An integration engine is configured to integrate a social media, enterprise resources, and customer relationship management. A maintenance module is configured to maintain the platform in the cloud to enable the plurality of the vendors, the plurality of stakeholders and the plurality of users to interact with each other through the platform in real time to acquire a desired data or service.

According one embodiment herein, the system further comprises an analytics module for providing analytics in a plurality of ways based on one or more attributes. The attributes are set by the rule engine, and the plurality of attributes includes a product or service information, demographic details, financial details, and preferences.

According one embodiment herein, the system further comprises a demand projecting module for projecting a demand for the plurality of products and services based on the results provided by the analytics module.

According one embodiment herein, the authentication details includes a unique user id and a password.

According one embodiment herein, the plurality of vendors and the plurality of stakeholders operate in a standalone mode or shared mode.

According one embodiment herein, the preferences include price range of a product or service, location, ranking of a product or service, and a brand name, and the preferences are input by a user.

According to one embodiment herein, the users, the vendors and the brands register on the platform by providing the necessary credentials. The system generates unique user-ids for the user, vendors and the brands after authenticating the user credentials. The platform stores the user credentials along with the unique user-ids. The user access the system with the unique user-id. The user is allowed to add/change/modify/edit/delete the user credentials at any point in time and the same is updated in the platform.

According to one embodiment herein, the system provides an information exchange platform and framework across the whole products or solutions or services provided by the registered brands or vendors for fast and improved engagement with various stakeholders of the users, vendors and brands, involved in the whole life cycle of the product or solution or service. The user is linked or associated to product/service, which in turn is tagged to a unique identifier. The identifier includes but not limited to a unique code, one or more alphabets, one or more numerals, mobile number, IMEI number, or a combination of thereof.

According to one embodiment herein, the services includes such as but not limited to banking and financial institutions (BFI), educational services, business-to-business, business-to-consumer, health services and e-governance.

According to one embodiment herein, the system provides a platform for collecting valuable feedback and complaints from the users at various stages of whole product or solution or service experience. The system provides a better reach to the user and ensures that the feedbacks are tracked closely to deliver the right or appropriate products and services and address any product or service related issues.

According to one embodiment herein, the system provides a method for tracking sales, purchases, warranty, insurance and other services used by the users by connecting an item purchased by the user with the brands and confirming a sales transaction. The system improves a consumer satisfaction by preventing an abuse of warranty.

According to one embodiment herein, the user enables automated notifications related to various products and services availed. The system is configured for the whole automated notification or responses to include but not limited to warranties, insurance, services, replacements, exchange offers, second buys and manage the feedback for the respective notifications to ensure better engagement and relationship on a long term. The system provides a single click button to notify the brands on the services to be provided on demand to the user instantly.

According to one embodiment herein, an activity is initiated on the platform, when the registered user avails a product or service from a particular registered brand (first brand) once. The associated and registered stakeholder engages with the associated activity based on the privacy and usage policy of the user and the first brand. For example, when a user A buys a car from a brand M, the user is able to include the car details on the platform which is tagged with his user-id. The platform enables the activity X1, wherein a direct connection is established between the brand M and the user A. The related stakeholders associated with the brand M such as car insurance service provider K (who is also a registered user on the platform), accessory partner P (who are also registered user and partners with first brand M), and various departments of the first brand M will be able to connect with the user A on the platform. The user A and brands M, P, K can engage in various activities related to the car C with the user A. The activities comprises of notifications, promotions, consumer support services or various other services that can be availed by the user A. If user's A privacy and usage policy allows other registered stakeholders (who are not partners with the first brand M) to contact the user A, the stakeholders will be able to directly engage and communicate with the user A for the car C related products and services through the platform. In the similar manner, the same user A can have various activity circles related to the various products and services availed by the user A.

Similarly, when a user A2 buys a car C2 from a brand M2. The user A2 includes the car C2 details on the platform or details pushed to user A2 and the details are tagged with his user-id. The platform enables the activity X2, wherein a direct connection is established between the brand M2 and the user A2. All the related stakeholders associated with the brand M2 such as car C2 insurance service provider K2 (who is also a registered user on the platform), accessory partner P2 (who are also registered user and partners with first brand M2), and various departments of the second brand M2 will be able to connect with the user A2 on the platform. The user A2 and the brands M2, P2, K2 will be able to engage in various activities related to the car C2. The activities comprises of notifications, promotions, consumer support services or various other services that can be availed by the user A2. For example, if the user A2 avails or buys a music system C3 from the accessory partner P2 of the brand M2, then the accessory partner P2 himself become a brand M3 for the user A2 and starts a new activity circle.

According to one embodiment herein, the platform enables the users and the brands to choose between multiple securities or verification or authentication features such as but not limited to captcha and one time password (OTP). The user is identified by various parameters to bring unique user identity with the logics built around to manage and eliminate duplication of the user in the system. The user profile management carries the de-duplication parameters to prevent and ensure unique IDs are defined for each user.

According to one embodiment herein, the platform defines a value index for each set of data based on the need, want and wish list scale to ensure the right proposition is made for business value creation.

According to one embodiment herein, the system and method comprises an application for connecting, communicating and engaging with users, vendors, brands and associated ecosystem.

According to one embodiment herein, the platform enables the user to directly communicate with brands and their associated stakeholders with the help of single click button provided on the platform. The user can talk, chat, email to the brand or even associated department at the platform without going through various channels or iterations to connect with the exact department/section/experts related to the product/service of the brand. The user is able add/update/delete brand product and services based on his preference and also locate the availability of product or services based on location the user is positioned or filter based on location that user prefers to review based on his preference or need.

According to one embodiment herein, the system provides an interlink roadmap for a single click button. The platform enables the user to navigate through the activity channel related to the product or the service availed (or to be availed) to establish the single click facility to the desired department/section/experts related to the product/service of the brand and directly communicate with them.

According to one embodiment herein, the platform further comprises live streaming of information across various stakeholders for aspects of knowledge sharing by user's community or experts, product launch information (to include usage guide, troubleshooting methods, community information/experience information) or service information in various forms of notification, information exchange and interfaces such as but not limited to Live Radio, RSS Feeds, Training Materials, Whitepapers, Issue Guides, Recall management, Quality trackers/issues and Field calls.

According to one embodiment herein, the system prioritizes stakeholder's actions for the products or solutions or services using an engagement matrix.

According to one embodiment herein, the system fills in the functional gaps of the vendors or channels in their marketing, sales and service strategies by effectively leveraging the platform.

According to one embodiment herein, the system creates access pipe to all the users at anytime, anywhere while ensuring security of the data.

According to one embodiment herein, the system further provides an ability to decode error code on devices by comparing with standard patterns and providing more meaningful information According to one embodiment herein, the brands uses communication interface to communicate with the system or products or services to provide information associated with them, such as but not limited to diagnostic information, setup status, or the parameters that are measured. The information aid in making decisions by measuring, controlling and monitoring the associated devices. The system further provides information on the health status of the associated devices by capturing predictive maintenance information, service or replacement need.

According to one embodiment herein, the system further provides interfaces for developing user applications on platform to co-create values for each other, thus providing a building block for value added features.

According to one embodiment herein, the system and method comprises sentimental analysis. The sentimental analysis provides reviews on various products, services and brands or vendors to enable users to evaluate products or services so that users are in a position to decide with whom and how they want to do business. Furthermore, since users can get detailed insight into the competitor's product/service information, they could read the community reviews of that particular product or service and make intelligent decisions.

According to one embodiment herein, the system provides an intelligent pipe that carries all the useful information pertaining to the user. The system also embeds protective filters to prevent any information leakage across the whole system and also warranties that the right information is sent to the right user with various levels of security, privacy, data protection, authentication and availability.

According to one embodiment herein, the system further provides interfaces for a multi-tenant XaaS Services; where 'X' stands for 'Anything' and is not just limited to software as a service, hardware as a service, connectivity as a service, collaboration as a service, security as a service, privacy as a service, availability as a service, data protection as a service, connect as a service, engagement as a service, etc. As the platform provides "multi-tenancy" capability; multiple tenants shares the XaaS platform. XaaS hardware and software infrastructure is deployed on the platform, without recognizing the existence of other tenants to provide a level of "privacy and isolation". The system maximizes resource-sharing capability of the XaaS system. The system receives service requests from multiple users belonging to different tenants of the multi-tenant XaaS system.

According to one embodiment herein, the system is set or configured to ensure that resources in the XaaS system are categorized into different buckets or resource groups. Each bucket handles a category of the service requests. Based on the transactions associated with each bucket the cost is estimated for the service offerings of interest. The system dispatches service requests to resource groups according to the estimated costs, whereby the resources are shared, among the users, without impacting each other. This approach makes the platform dynamic even when there are no commonalities in the data the applications use.

According to one embodiment herein, Service Level Agreements (SLAs) are reviewed and agreed upon during the enrolment process of the tenants. SLAs specify desired performance levels to be delivered as well as the cost increments to be added for additional value added services when these requirements and resources scale-up the set limits. The system also plans and allocates a resource capacity for each tenant to ensure that SLA requirements are fulfilled. This allocation leads the platform to conservatively provision the resources in order to adequately cover tenant's peak and off-peak load requirements; thus managing the demand based allocations and support effectively.

According to one embodiment herein, the system further integrates with any existing retail system or CRM or any other IT systems. The system bring in interface or communication block set in any form such as but not limited to NFC, GPS, or any wired or wireless interfaces, to install and connect the necessary drivers, so as to connect to any of above systems for integration The system provides a single sign-in for membership, brand or vendor loyalty, push notifications and redeem points at any outlets or for any products/services immaterial of where the points where offered.

According to one embodiment herein, the system eliminates various barriers in accessing the product or service related information. The system provides access to all information on the platform at any time and from anywhere. The system also provides ease of use and comfort for users. The system eliminates use of paper documents related to product or service namely but not limited to warranty, insurance, user guide, manual, instruction manuals, software drivers etc., and digitizes the process and so always providing latest versions.

According to one embodiment herein, the system enables the user to extend warranty, insurance or purchase accessories without going through the hassle of intermediaries or agencies by directly getting connected to brands or vendors.

According to one embodiment herein, the system enables the users to share product or service experience with other like-minded or similar product or service owners or to all the community of users.

According to one embodiment herein, the platform enables the users to filter activity circle preview based on certain criteria such as but not limited to demography, location and types of products or services.

According to one embodiment herein, the system enables the consumers to "On-the-go" product or service purchase and seamless transfer of product or service ownership documents and all related information and storage at commonplace and creating circles as detailed above.

According to one embodiment herein, the platform enables the user (first user) to sell or transfer one or more products or services to another user (second user). Once, the product or service is sold or transferred to the second user, the activity circle is deleted from the first user and a request to accept the activity circle is sent to the second user.

According to one embodiment herein, the system enables the users to create "wish list". The user created "wish list" is showcased to one or more relevant registered brands or vendors based on user privacy settings. Further, one or more brands, users, community/group, experts or vendors are allowed to interact with the user to recommend or offer products or services while ensuring private settings of user or their interests.

According to one embodiment herein, the system enables the user to book, review, learn, share or provide feedback in advance on new product or service launches, or repairs or installation of products or services or test drive of vehicles or demos of products/services on the platform.

According to one embodiment herein, the platform enables brands or vendors to generate various product, services or user specific reports and analysis.

According to one embodiment herein, a reminder is sent to the plurality of the users, the plurality of the stakeholders, and to the plurality of the vendors, when the SLA is about to expire. Further, a provisional escalation is executed using one or more ways, when the SLAs are not met. The reminders are sent before the expiry of the SLAs while the provisional escalation is sent after the expiry of the SLAs.

FIG. 1 illustrates a block diagram of a system and method for connecting, communicating and engaging consumer, brands and related ecosystem, according to one embodiment herein. FIG. 1 includes a platform 100. The platform 100 is a cloud framework used for engaging a plurality of users, a plurality of brands, and a plurality of stakeholders, in a single ecosystem. FIG. 1 includes a user community 101. The user community includes a plurality of users 101a-101n. Each of the user 101a-101n access the platform 100 using a communication device to use the one or more products or services from the platform 100. According to an embodiment herein, each of the user 101a-101n can communicate with each other using the user community 101.

FIG. 1 includes a brand community 102. The brand community 102 includes a plurality of brands 102a-102n. The plurality of brands 102a-102n register a plurality of products and/or services on the platform 100 using a communication device. The brands 102a-102n provides a plurality of products and/or services to the each of the user 101a-101n. Further, the brands 102a-102n communicates with each other using the brand community 102.

FIG. 1 includes a stakeholder community 103. The stakeholder community 103 includes a plurality of stakeholders 103a-103n. The plurality of the stakeholders 103a-103n registers a plurality of products and/or services on the platform 100 using a communication or computing device. According to an embodiment herein, the plurality of stakeholders 103a-103n are associated with a plurality of products and/or services related to one or more brands 102a-102n. According to one embodiment herein, the plurality of stakeholders 103a-103n associates a plurality of products and/or services to one or more users 101a-101n. According to an embodiment herein, the association of the plurality of the stakeholders 103a-103n with the brands 102a-102n and with the users 101a-101n is determined by the platform 100. According to one embodiment herein, the association of the plurality of the stakeholders 103a-103n with the brands 102a-102n is determined by the stakeholders community 103. Further, the plurality of the stakeholders 103a-103n communicates with each other using the stakeholder community 103.

According to one embodiment herein, the plurality of the users 101a-101n, the plurality of the brands 102a-102n, and the plurality of the stakeholders 103a-103n communicate with each other via the platform 100.

Figure 2:
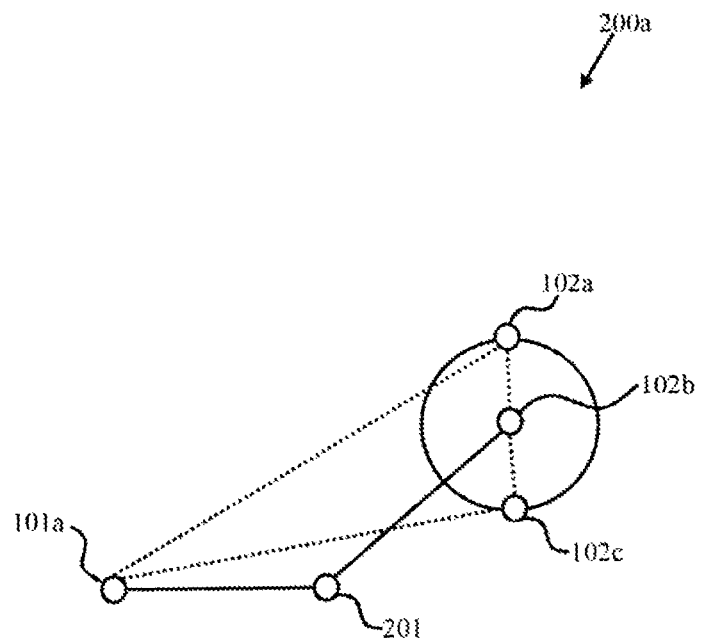
FIG. 2 illustrates a schematic representation of an activity circle related to a product or a service availed by user from a brand or vendor and registered stakeholders (who are partners with the brand or vendor) generated using a method for connecting, communicating and engaging user, brands or vendor and related ecosystem, according to one embodiment herein.

FIG. 2 illustrates an activity circle related to a product or a service availed by the user from a brand or vendor and registered stakeholders (who are partners with the brand), according to one embodiment herein. With respect to FIG. 2, an activity is initiated on the platform, once the registered user 101a avails a product or service 201 from a particular registered brand 102b. The activity circle 200a related to a product or a service 201 availed by the user 101a from a brand 102b and registered stakeholders (who are partners with the brand) 103a and 103c is as shown in FIG. 2. The associated registered stakeholders 103a and 103c engages with the activity 200a based on the privacy and usage policy of the user 101a and the said brand 102b. For example, when a user 101a buys a car i.e. product 201 from the brand 102 b. The user 101a includes the car 201 details on the platform which is tagged with the user's 101a user-id. The platform enables the activity 201, wherein a direct connection is established between the brand 102b and the user 101a. All the related stakeholders 103a and 103c associated with the brand 102b such as car insurance service provider 102a (who is also a registered brand and partner with the brand 102b), accessory partner 102c (who is also a registered brand and partner with the brand 102b), and various departments of the brand 102b (not shown in FIG. 2) are able to connect with the user 101a on the platform. The user 101a and brands 102a, 102b and 102c are able to engage in various activities related to the car 201. The activities comprises but not limited to, of notifications, promotions, consumer support services or various other services that can be availed by the user 101a.

Figure 3:
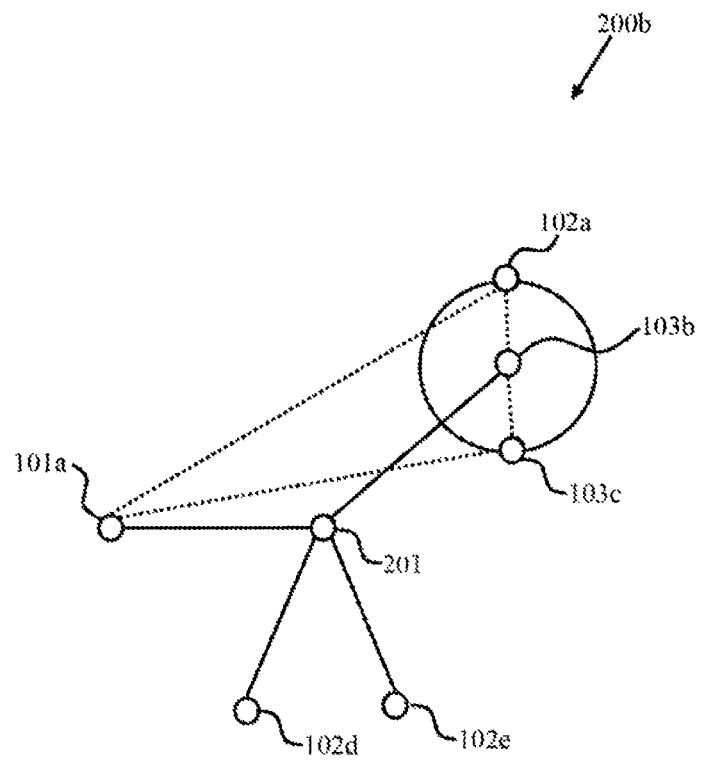
FIG. 3 illustrates a schematic representation of an activity circle related to a product or a service availed by the user from one or more brands or vendors and registered stakeholders (who are partners or non-partners of the brand or vendor) generated using a method for connecting, communicating and engaging user, brands or vendor and related ecosystem, according to one embodiment herein.

FIG. 3 illustrates an activity circle related to a product or a service availed by the vendors from one or more brands and registered stakeholders (who are partners or non-partners of the brand), according to one embodiment herein. With respect to FIG. 3, an activity is initiated on the platform once the registered user 101a avails a product or service 201 (as shown in FIG. 2) from a particular registered brand 102b. The activity circle 200b related to a product or a service 201 availed by the user 101a from a brand 102b and registered stakeholders (who are partners or non-partners of the brand 102b) 103a, 103c, 103d and 103e is as shown in FIG. 3. The associated registered stakeholders 103a, 103c, 103d and 103e engages with the activity 200b based on the privacy and usage policy of the user 101a and the said brand 102b. If user 101a privacy and usage policy allows other registered stakeholders 103a, 103c, 103d and 103e (who are not partners with the brand 102b) to contact the user 101a, the stakeholders 103a, 103c, 103d and 103e are able to directly engage and communicate with the user 101a for the 201 related products and services through the platform. For example, when a user 101a buys a car i.e. product 201 from the brand 102. The user 101a includes the car 201 details on the platform which is tagged with the user 101a user-id. The platform enables the activity 200b, wherein a direct connection is established between the brand 102b and the user 101a. All the related stakeholders 103a, 103c, 103d and 103e associated with the brand 102b such as car insurance service provider 102a (who is also a registered brand and partner of the brand 102b), accessory partner 102c (who is also a registered brand and partner of the brand 102b), and spare part supplier 102d (who is not a registered brand and not a partner of the brand 102b) are able to connect with the user 101a on the platform based on the privacy and usage policy of the user 101a and the said brand 102b. The user 101a and brands 102a, 102c, 102d and 102e are able to engage in various activities related to the car 201. The activities comprises of but not limited to notifications, promotions, consumer support services or various other services that can be availed by the user 101a.

Figure 4:
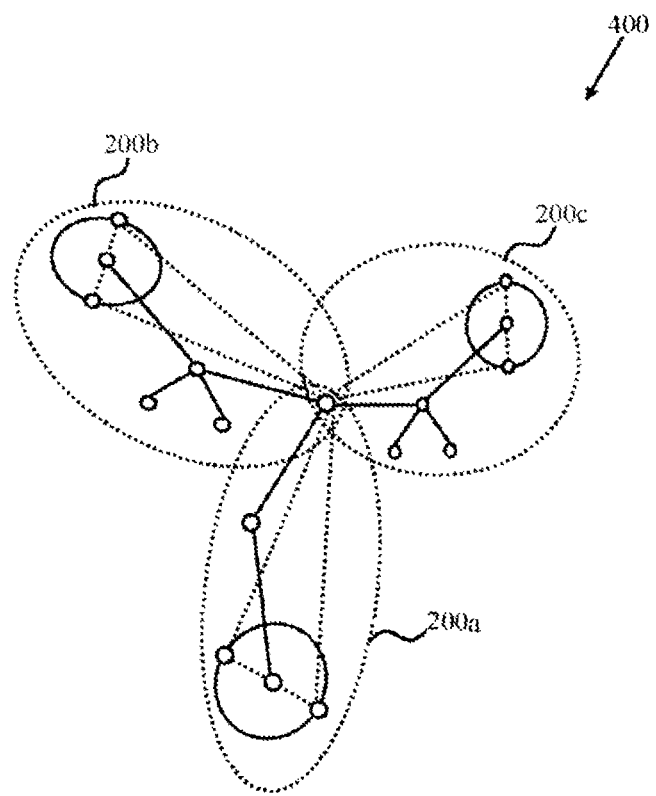
FIG. 4 illustrates a schematic representation of plurality of activity circles related to plurality of products or services availed by the user from one or more brands or vendors and registered stakeholders generated using a method for connecting, communicating and engaging user, brands or vendor and related ecosystem, according to one embodiment herein.

FIG. 4 illustrates plurality of activity circles related to plurality of products or services availed by the user from one or more brands and registered stakeholders, according to one embodiment herein. The user can have various activity circles 200a, 200b and 200c related to the various products and services availed by the user.

Figure 5:
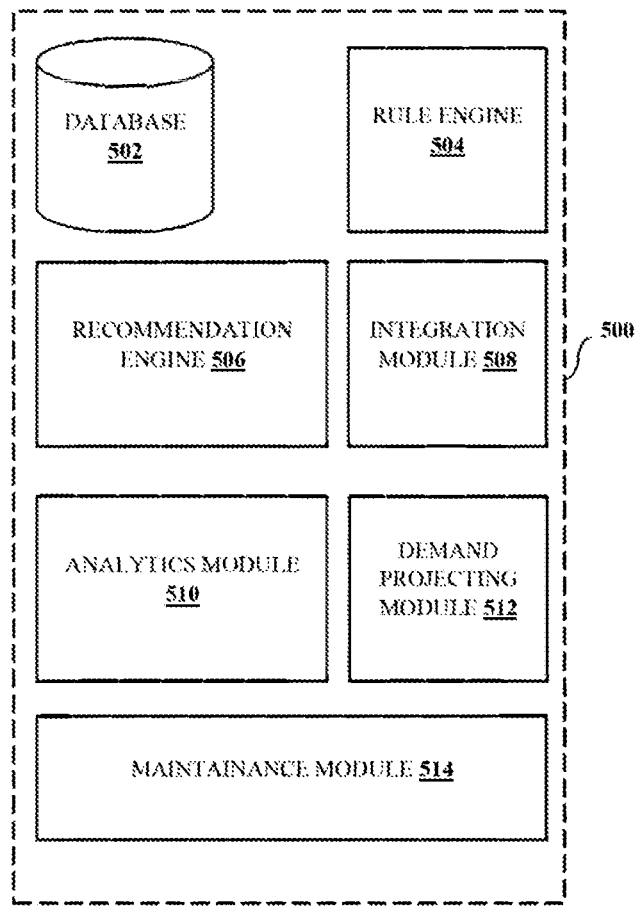
FIG. 5 illustrates the system components for connecting, communicating, and engaging one or more brands with an end user, according to one embodiment herein.

FIG. 5 illustrates system components of an online platform 500, which engages plurality of vendors, plurality of stakeholders, and a plurality of the end users. According to one of the embodiments of the embodiments herein, the online platform 500 and the platform/application 123 is the same. In yet another embodiment of the embodiments herein, the platform 500 and the platform/application 123 are different. The platform 500 is accessed by the plurality of the vendors, plurality of the stakeholders, and the plurality of end users using a communication device.

The platform 500 includes a database 502. The database 502 is used for storing one or more information. The information stored in the database 502 include but not limited to product information, service information, product/service identifier, vendor information such as vendor's name, vendor's contact address, vendor's login information, vendor's products and services, pricing of the vendor, geographic location of the vendor, warranty of the products and services, and the like, stakeholder information such as stake holder's name, stakeholder's login information, plurality of products and services the stakeholder is associated with, stakeholder's contact details, stakeholders geographic location and the like, user information like user's name and address, user's login information, product and services the user needs, demographic location of the end user and the like. Further, the database 502 stores metadata about each of the information collected. The metadata stored by the database 502 include but not limited to number of vendors under one or more category, number of stakeholders, memory space occupied by storing vendor information and stakeholder information, memory space left, and the like. In an embodiment, there is a single database for storing all the above mentioned information. In another embodiment, there are one or more databases for storing the above mentioned information.

The platform 500 includes a rule engine 504. The rule engine 504 is configured for setting one or more rules for the operation of the platform 500 according to one or more attributes. The rule engine 504 is configures to generate one or more rules-set that configure a recommendation engine to generate recommendations relating to products and services of possible interest to the plurality of the vendors, the plurality if stakeholders, and the plurality of the end users. The rule engine 504 analyzes the information provided to discover universal relationships across brand classifications based on non-transaction correlations among one or more products and services. The relationships are established via one or more algorithms, based on AI techniques: neural networks, multi-variate analysis, inference reasoning, Bayesian analysis, and the like.

Further, the rule engine 504, sets one or more rules according to which the engagement between the plurality of vendors' products and services, the plurality of stakeholders' products and services are related. Furthermore, the rule engine 504 sets one or more financial rules, according to which the platform 500 should perform. In an embodiment, the rules in the rule engine 504 are set by the owner of the platform 500. In another embodiment, the plurality of vendors, the plurality of the stakeholders, and the plurality of the end users set the rules. In yet another embodiment, the rules set by each of the vendors, stakeholders, and the end users are customizable.

The platform 500 includes a recommendation engine 506. The recommendation engine 506 recommends one or more products and services to the plurality of vendors, the plurality of stakeholders, and the plurality of the end users based on one or more attributes. For example, if the vendor has registered as a car manufacturer, the recommendation engine 506 recommends the services such as channel for selling the cars, car insurances, customized sales and services for the car and the like. Similarly, when a stakeholder registers himself as an insurance provider, the recommendation engine 506 recommends one or more channel through which the insurance can be sold, car manufacturers with whom insurance can be tied up strategically and the like. Further, the recommendation engine 506 constructs cross-brand rules that are synchronized with the rules set and generate recommendations. In an embodiment, the recommendation engine 506 generates recommendations based on the rules set by the rule engine 504. In another embodiment, the recommendation engine 506 recommends one or more products and services based on the customized options opted by the plurality of the vendors, the plurality of the stakeholders, and the plurality of the end users.

The platform 500 includes an integration module 508. The integration module 508 is used for integrating the data obtained from information provided by the plurality of the vendors, the plurality of the stakeholders, and the plurality of the end users, one or more social media websites, information obtained from other sources and aggregating the obtained data to the Enterprise resource solution, Customer-relationship management and the like. The integrated module 508 is used for integrating the targeted and personalized content for the plurality of the vendors, the plurality of the stakeholders, and the plurality of the end users, and to market and recommend one or more products/services based on the integrated information obtained.

The platform 500 includes an analytics module 508. The analytics module 508 provides one or more analytics to the plurality of the vendors, plurality of the stakeholders, and the plurality of the users in one or more dimensions. The dimensions to derive the analysis is set by the rule engine 506. The analysis provided to the plurality of the vendors, the plurality of the stakeholders, and the plurality of end users include, but are not limited to the sales report, sales according to the demography, trends in the market, fastest growing associations in the market, user preferences in the market, major players in the market, and the like.

The platform 500 includes a demand projecting module 512. The demand projecting module 512 projects the demand for plurality of the products and services based on the analysis derived from the analytics module 508. The demand projecting module projects the existing trend and the demand for the recommended one or more products and services. In an embodiment, the information provided by the demand-projecting module 512 could be used by the plurality of the vendors, and the plurality of the stakeholders for understanding the end user consumption, inventory management and the like. Further, the demand-projecting module 512 uses statistical methods such as time-series forecasting for analyzing the future demand and trends.

The platform 500 includes a maintenance module 514. The maintenance module 514 is responsible for maintenance of the platform 500. The maintenance module 514 prevents the platform from getting hacked, providing protection against threats, fixing the bugs, upgrading the platform, maintaining one or more versions of the platform, securing the server through which the platform operates, providing backup and the like.

Figure 6:
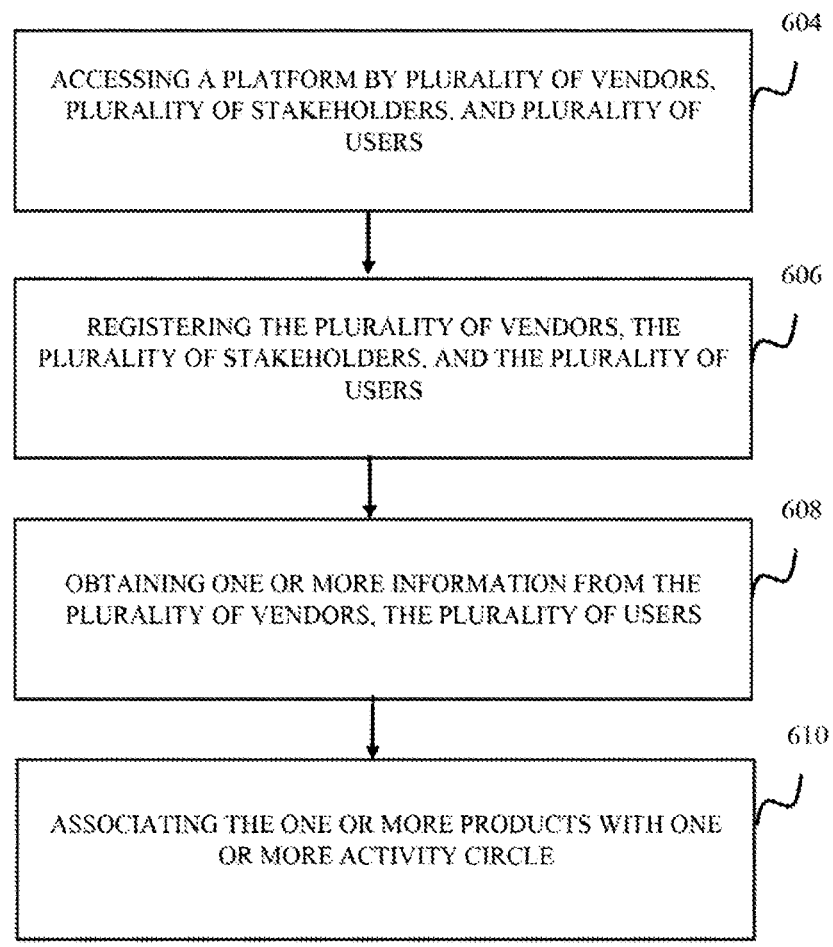
FIG. 6 illustrates a flowchart explaining a method for connecting, communicating, and engaging one or more brands with an end user, according to one embodiment herein.

FIG. 6 illustrates a flowchart for engaging a plurality of vendors, plurality of stakeholders, and a plurality of end users in an online market place. According to one embodiment of the embodiments herein, vendors include the primary product merchants/service providers, and primary service providers. Examples of the primary product merchants and service providers include but not limited to manufacturers, distributors, service centers, retailers, wholesalers, consumers, end users, recyclers, logistics providers, insurance providers, and the like. According to an embodiment of the embodiments herein, stakeholders are the secondary product merchants, and secondary service providers. Examples of the secondary product merchants and secondary service providers include manufactures, distributors, service centers, retailers, wholesalers, consumers, end users, logistic providers, insurance providers, and the like. According to an embodiment herein, users are the end users or customers who uses the package of the primary product/service and the secondary product/service.

At the step 604, the platform 500 is accessed by the plurality of the vendors, the plurality of the stakeholders, and the plurality of the users. The platform 500 is a web platform that is accessed using one or more computable devices. Examples of the computable device include but not limited to desktop computer, laptop computer, smartphone, smart televisions, phones having communication network to access the platform 500 and the like. The computable device access the platform 500 using a communication network. The communication network can be a wired network or a wireless network. Examples of the communication network include, but not limited to a local area network, a wide area network, an internet, a public switched network, a telecommunication network, a wireless network, and a satellite network. Further, the platform 500 is accessed using a dedicated web server, a mobile application, or using third party applications.

According to one of the embodiments of the embodiments herein, accessing the platform 500 includes browsing the platform for one or more products and related services by the plurality of the vendors, the plurality of the stakeholders, and the plurality of the end users. The platform 500 provides the details of the product, service, and the associated products and services, and the like.

At the step 606, each of the plurality of the vendors, each of the plurality of the stakeholder, and each of the plurality of the end user registers to the user using one or more methods. According to an embodiment of the invention, the plurality of the vendors, the plurality of the stakeholders, and the plurality of the end users register to the platform by providing one or more credentials. Examples of the credentials include, but are not limited to the unique email id, a phone number, IMEI number, mobile identifier, digital signature, image recognition and the like. Further, the platform 500 prompts to provide a secure password for logging in to the platform. In an embodiment of the invention, single registration is valid for a user to register as a vendor, stakeholder, and an end user. In another embodiment of the invention, the user has to register separately as a vendor, stakeholder, and an end user. The credentials of the plurality of the vendors, the plurality of the stakeholders, and the plurality of the end users are stored in a database. When each of the vendor, stakeholder, and the end user registers to the platform 500, the uniqueness of the login credentials is verified. Further, each of the plurality of the vendors, each of the plurality of the stakeholders, and each of the plurality of the end users can modify, delete, and add one or more login accounts.

At step 608, one or more information from the plurality of the vendors, the plurality of the stakeholders, and the plurality of the end users are obtained. The one or more information include but are not limited to the product and service preference, associated product and service preference, product identifier, service identifier, manufacturer identifier, stock keeping unit number, number of products/services available, financial credential, mobile number, IMEI number, income group, age group, demographic details, and the like. The one or more information obtained from the plurality of the vendors, the plurality of the stakeholders, and the plurality of the end users are stored in the database 502.

At the step 610, the one or more products and services are associated with each other according to the rules determined by the rule engine 504. The association of each of the plurality of the vendors with the each of the plurality of the stakeholders is referred as an activity circle. In an embodiment, the plurality of the vendors, and the plurality of the stakeholders can associate the plurality of products and services provided. In another embodiment of the invention, the platform 500 determines the association of the one or more vendor products and services with the one or more products and services of the stakeholders. In an embodiment, a limit is set by the rule engine 504 for associating the number of products and services. In another embodiment of the invention, there is no limit on the number of associations a product and service can have.

According to one embodiment of the invention, each of the plurality of the vendors, the plurality of the stakeholders, and the plurality of the end users can operate in a standalone mode. Standalone mode refers to a system where each of the plurality of the vendors, associate the product or service with only of the plurality of the stakeholders, and vice versa. For example, one of the car sellers A who is a vendor associates that car with an insurance provider B who is a stakeholder. According to this example, the car seller A does not associate with any other insurance provider except the insurance provider B.

According to another embodiment of the invention, each of the plurality of the vendors, the plurality of the stakeholders, and the plurality of the users can operate in a shared mode. Shared mode refers to a system where each of the plurality of the vendors, associate the product or service with many of the plurality of the stakeholders, and vice versa. For example, one of the car sellers A who is a vendor associates that car with an insurance provider B, C, and D who are stakeholders. According to this example, the car seller A associates with one or more insurance providers. Further, according to an embodiment of the embodiments herein, the association of the products and services in standalone mode or in shared is determined by the platform 500. In another embodiment, the association of the products and services in standalone mode or in shared mode is determined by the vendor. In yet another embodiment, the association of the products and services in standalone mode or in shared mode is determined by the stakeholder.

According to one embodiment of the invention, the recommendation engine 506, recommends one or more products and services, for associating one or more products and services with each other, to the plurality of the vendors, the plurality of the stakeholders, and to the plurality of the end users, based on the one or more information provided and the rules determined by the rule engine 504.

According to the embodiments of the embodiments herein, based on the one or more associations between the products and services between the plurality of the vendors and the plurality of the stakeholders, the analytics module 510 provides one or more analytics in one or more dimension to the plurality of the vendors, the plurality of the stakeholders, and to the plurality of the users. Examples of the analytics provided by the analytics module 510 include but are not limited to user engagement with the one or more vendors, user engagement with one or more stakeholders, user engagement according to the demography, conversion due to advertising, conversion due to targeted advertising, and the like.

According to one embodiment herein, further to associating one or more products and services, the customer relationship management (CRM), social media, and enterprise resource planning (ERP) is integrated using an integration module 508. The platform 500 provides customized integration of the CRM, social media marketing, and ERP to each of the plurality of the vendors, and to the plurality of the stakeholders to increase the user engagement. Further, the demand projecting module 512 projects the demands of the products and services and the associations using one or more methods.

According to one embodiment herein, one of the advantages of the system is to identify spurious or duplicate products to promote the usage of genuine spares/products/services. The system provides access to all information on the product/service at any time and from anywhere to brands or vendors. Brands or vendors can verify the authenticity of product/service and take necessary actions to curb unauthorized ones. The system facilitates a community of users, brands, vendors, suppliers and the stakeholders to interact with each other or among the community members in a plurality of ways using a multichannel communication. The brand is enabled to access the user community. The system facilitates promotion and integrated Service desk on Community. The system rewards loyalty with incentive Points, accumulation of incentive points, provides a discount with respect to the accumulated points, redemption of points, and management of discounts with respect to the redemption of points. The system provides a service desk to capture and assign text and voice sentiments, to enable a pattern based capture for impact and assignment, to provide a text and pattern based identification and link to identify a root cause of a problem generated or deficiency of a product or service, and to capture and link Internal and External SLAs. The system facilitates a sequencing of products and supply to estimate and improve a usage probability and permutations to produce simple outcomes. The system further provides a Brand Application Frame to generate and use Brand Applications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented method comprising instructions stored on a non-transitory computer readable storage medium and executed on a computing device provided with a hardware processor and memory for interaction between users, vendors, brands stakeholkders of products and services in real time during usage or consumption life cycle of product and services using a plurality of applications/algorithms, the method comprising steps of:

accessing a cloud based platform by a plurality of vendors, a plurality of stake holders, and a plurality of end users through a computing device;

registering the plurality of vendors, the plurality of stakeholders and the plurality of end users with the cloud based platform through a registration module in the computing device, wherein the step of registering comprises providing login details and authentication details of the plurality of vendors, the plurality of stakeholders and the plurality of end users through the computing device;

collecting a plurality of data from the plurality of vendors, the plurality of stakeholders, and the plurality of users with the computing device through an application, wherein the plurality of data includes a product information, mobile number a product identifier, warranty details and demographic details;

storing the plurality of data collected from the plurality of vendors, the plurality of stakeholders in a cloud data base through the computing device; and associating one or more products with one or more activity circles based on preferences through a rule engine in the computing device, and wherein the activity circle include the plurality of vendors, the plurality of stakeholders, and the plurality of users;

providing one or more analytics to the plurality of vendors, the plurality of stakeholders and the users through an analytics module in the computing device based on one or more attributes, and wherein the one or more attributes are set by the rule engine and wherein the one or more attributes include a product information, service information, demographic details, financial details, and preferences, and wherein the one or more analytics provided to the plurality of the vendors, the plurality of the stakeholders, and the plurality of end users include sales report, sales according to a demography, trends in a market, fastest growing associations in the market, user preferences in the market, and major players in the market, user engagement with the one or more vendors, user engagement with one or more stakeholders, user engagement according to the demography, conversion due to advertising, conversion due to targeted advertising;

projecting a demand for the plurality of products and services with a demand projecting module based on the results provided by the analytics module;

measuring and providing a net promoter score of one product or service by a user computing device;

creating an activity circle on a platform through an application and the computing device, when the registered user once avails a product or service from a particular registered brand for a first time, and wherein an association of each of the plurality of the vendors with the each of the plurality of the stakeholders is referred as an activity circle, and wherein the associated and registered stakeholders are engaged with the associated activity circle based on the privacy and usage policy of the user and the first brand, and wherein the user is provided with a plurality of activity circles related to the plurality of products and services availed by the user through an application;

defining a value index for each data set by the platform through an application based on a need, requirement (want) and wish list to ensure that a correct proposition is made for business value creation, and wherein the wish list is created by user;

creating a live feeding of information across the plurality of stakeholders for knowledge sharing by user's community or experts through an application, and wherein the information includes a product launch information (to include usage guide, troubleshooting methods, community information/experience information) and service details in a plurality of forms of notifications, information exchange and interfaces, and wherein the plurality of notifications, information exchange and interfaces include Live Radio, RSS Feeds, training materials, whitepapers, issue guides, recall management, quality trackers/issues, and field calls;

filling the functional gaps of the Brands, vendors or channels in purchase, making, marketing, sales and service strategies by leveraging the platform through an application;

creating access pipe to all the users at anytime, anywhere while ensuring security of the data through an application;

decoding error code on devices by comparing code on devices with standard or reference or preset code through an application;

providing interfaces for developing user applications on platform to co-create values for each other through an application, thereby providing a building block for value added features;

performing analysis through an application on the computing device, to provide reviews on the plurality of products, services and brands or vendors to enable users to enable users to evaluate products or services to enable the users to decide a business strategy and select customers for business, and wherein the users are enabled to get detailed insight into the competitor's product/service information to read the community reviews of a particular product or service to make appropriate decisions.

2. The method according to claim 1, further comprises monitoring a relationship between the plurality of vendors, the plurality of stakeholders and the plurality of users through a search engine in the computing device.

3. The method according to claim 1 further comprises integrating a customer-relationship management, a social media and an enterprise resource solution through an integration engine in the computing device.

4. The method according to claim 1 further comprises recommending one or more products and services to the plurality of vendors, the plurality of stakeholders, and the plurality of users through a recommendation engine in the computing device based on a plurality of attributes of the vendors, stakeholders and users, and wherein the plurality of attributes include a product information, service information, demographic details, financial details, and preferences, and wherein the plurality of attributes are collected and stored with respect to a respective vendor, stakeholder and user in the cloud database.

5. The method according to claim 1, wherein the authentication with an authentication module in the computing device includes multi-factor authentication comprising a unique user id, a password, a bio-metric data, voice, and retina of eye, and wherein the authorization details includes business policies and rules for a plurality of services and stakeholders.

6. The method according to claim 1, wherein the plurality of vendors and the plurality of stakeholders operate in a standalone mode or shared mode.

7. The method according to claim 1, wherein the preferences include price range of a product or service, location, ranking of a product or service, and a brand name, and wherein the preferences are input by a user.

8. The method according to claim 1, wherein the plurality of vendors, the plurality of stakeholders, and the plurality of users registered to portal searches, retrieves and contacts each other based on the preferences or registered credentials through the search engine.

9. A system for interaction between users, vendors, brands, stakeholders of products and services in real time through one or more applications, during stage or consumption life cycle of product or services, the system provided with a hardware processor and memory comprising:

registration module run on the hardware processor and configured for registering a plurality of vendors, a plurality of stakeholders and a plurality of end users, wherein the registration module is configured to receive a login and authentication details from the plurality of vendors, the plurality of stakeholders and the plurality of end users to complete a registration;

a cloud database for storing a plurality of data related to plurality of products, services, a plurality of vendors, a plurality of stakeholders, and a plurality of users;

a rule engine run on the hardware processor and configured to generate a set of rules to generate a plurality of recommendations with respect to the plurality of the vendors, the plurality of stakeholders and the plurality of users;

a search engine communicatively coupled with the cloud database, and wherein the search engine is run on the hardware processor ad configured to search and retrieve relationships between the plurality of the vendors, the plurality of stakeholders and the plurality of users based on the generated set of rules;

a recommendations engine run on the hardware processor and configured to recommend one or more products and services with respect the plurality of the vendors, the plurality of stakeholders and the plurality of users based on the searched and retrieved relationships between the plurality of the vendors, the plurality of stakeholders and the plurality of users;

an integration engine run on the hardware processor and configured to integrate a social media, enterprise resources, and customer relationship management; and a maintenance module run on the hardware processor and configured to maintain the platform in the cloud to enable the plurality of the vendors, the plurality of stakeholders and the plurality of users to interact with each other through the platform in real time to acquire a desired data or service;

analytics module run on the hardware processor and configured for providing one or more analytics based on one or more attributes, and wherein the one or more attributes are set by the rule engine and wherein the one or more attributes include a product information, service information, demographic details, financial details, and preferences, and wherein the one or more analytics provided to the plurality of the vendors, the plurality of the stakeholders, and the plurality of end users include sales report, sales according to a demography, trends in a market, fastest growing associations in the market, user preferences in the market, and major players in the market, user engagement with the one or more vendors, user engagement with one or more stakeholders, user engagement according to the demography, conversion due to advertising, conversion due to targeted advertising;

a demand projecting module run on the hardware processor and configured for projecting a demand for the plurality of products and services based on the results provided by the analytics module;

wherein a net promoter score of product or service is measured and provided by a user computing device, and wherein an activity circle is created by the computing device, and wherein an activity circle is created by the computing device through an application, when the registered user once avails a product or service from a particular registered brand for a first time, and wherein an association of each of the plurality of the vendors with the each of the plurality of the stakeholders is referred as an activity circle, and wherein the associated and registered stakeholder are engaged with the associated activity circle based on the privacy and usage policy of the user and the first brand, and wherein the user is provided with a plurality of activity circles related to the plurality of products and services availed by the user, and wherein a value index is defined for each data set by the platform based on a need, requirement (want) and wish list to ensure that a correct proposition is made for business value creation, and wherein the wish list is created by user, and wherein a live feeding of information is creating and shared across the plurality of stakeholders for knowledge sharing by users community or experts, and wherein the information includes product launch inhumation (to include usage guide, troubleshooting methods, community information/experience information) and service details in a plurality of forms of notifications, information exchange and interfaces, and wherein the plurality of notifications, information exchange and interfaces include Live Radio, RSS Feeds, training materials, whitepapers, issue guides, recall management, quality trackers/issues, and field calls, and wherein the functional gaps of the Brands, vendors or channels in purchase, making, marketing, sales and service strategies are filled in by leveraging the platform, and wherein an access pipe is created for all the users at anytime, anywhere while ensuring security of the data, and wherein an error code on devices is decoded by comparing code on devices with reference or standard or preset code paterns through an application, and wherein interfaces are provided for developing user applications on platform to co-create values for each other, thereby providing a building block for value added features, and wherein an analysis is performed through an application on the computing device, to provide reviews on the plurality of products, services and brands or vendors to enable users to evaluate products or services to enable the users to decide a business strategy and select customers for business, and wherein the users are enabled to get detailed insight into the competitor's product/service information to read the community reviews of a particular product or service to make appropriate decisions.

10. The system according to claim 9, further comprises an authentication module nm on the hardware processor and configured to perform an authentication, And wherein the authentication includes multi-factor authentication comprising a unique user id, a password, a bio metric data, voice, and retina of eye, and wherein the authorization details includes business policies and rules for a plurality of services and stakeholders.

11. The system according to claim 9, wherein the plurality of vendors and the plurality of stakeholders operate in a standalone ode or shared mode.

12. The system according to claim 9, wherein the preference include price range of a product or service, location, ranking of a product or service, and a brand name, and wherein the preferences are input by a user.

* * * * *